United States Patent [19]

Miller et al.

[11] Patent Number: 5,946,647
[45] Date of Patent: Aug. 31, 1999

[54] SYSTEM AND METHOD FOR PERFORMING AN ACTION ON A STRUCTURE IN COMPUTER-GENERATED DATA

[75] Inventors: James R. Miller, Mountain View; Thomas Bonura, Capitola; Bonnie Nardi, Mountain View; David Wright, Santa Clara, all of Calif.

[73] Assignee: Apple Computer, Inc., Cupertino, Calif.

[21] Appl. No.: 08/595,257

[22] Filed: Feb. 1, 1996

[51] Int. Cl.$^6$ .................................................. G06F 17/27
[52] U.S. Cl. ...................................... 704/9; 704/1
[58] Field of Search ................................ 704/1, 7, 9–10, 704/243; 707/513, 101–104

[56] References Cited

U.S. PATENT DOCUMENTS

| | | | |
|---|---|---|---|
| 5,115,390 | 5/1992 | Fukuda et al. | 364/146 |
| 5,130,924 | 7/1992 | Barker et al. | 704/1 |
| 5,164,899 | 11/1992 | Sobotka et al. | 704/9 |
| 5,202,828 | 4/1993 | Vertelney et al. | 364/419 |
| 5,247,437 | 9/1993 | Vale et al. | 704/1 |
| 5,369,575 | 11/1994 | Lamberti et al. | 704/1 |
| 5,574,843 | 11/1996 | Gerlach et al. | 395/118 |

OTHER PUBLICATIONS

TerryMorse Software "What is Myrmidon" Downloaded from the Internet at URL http://www.terrymorse.com (Publication Date Unknown), 2 pages.

Shoens, K. et al. "Rufus System: Information Organization for Semi–Structured Data," Proceedings of the 19th VLDB Conference (Dublin, Ireland 1993), pp. 1–12.

Schwarz, Peter and Shoens, Kurt. "Managing Change in the Rufus System," Abstract from the IBM Almaden Research Center, pp. 1–16.

Myers, Brad A. "Tourmaline: Text Formatting by Demonstration," (Chapter 14) in *Watch What I Do: Programming by Demonstration*, edited by Allen Cypher, MIT Press, (Cambridge, MA 1993), pp. 309–321.

Maulsby, David. "Instructible Agents," Dissertation from the Department of Computer Science at The University of Calgary (Calgary, Alberta—Jun. 1994), pp. 178, 181–188, 193–196 (from Chapter 5).

Rus, Daniela and Subramanian, Devika. "Designing Structure–Based Information Agents," AAAI Symposium (Mar. 1994), pp. 79–86.

*Primary Examiner*—Forester W. Isen
*Assistant Examiner*—Patrick N. Edouard
*Attorney, Agent, or Firm*—Carr & Ferrell LLP

[57] ABSTRACT

A system and method causes a computer to detect and perform actions on structures identified in computer data. The system provides an analyzer server, an application program interface, a user interface and an action processor. The analyzer server receives from an application running concurrently data having recognizable structures, uses a pattern analysis unit, such as a parser or fast string search function, to detect structures in the data, and links relevant actions to the detected structures. The application program interface communicates with the application running concurrently, and transmits relevant information to the user interface. Thus, the user interface can present and enable selection of the detected structures, and upon selection of a detected structure, present the linked candidate actions. Upon selection of an action, the action processor performs the action on the detected structure.

24 Claims, 10 Drawing Sheets

Bob:

This is my new phone number: (415) 555-1234 address: 1 Hilly Street
San Francisco, CA 94105

E-mail address: jdoe@work.com

Sincerely,

John Doe

Bob:

This is my new phone number: (415) 555-1234 | Call #  | Put in electronic telephone book address: 1 Hilly S... San Fra...

E-mail address: J...

Sincerely,

John Doe

SYSTEM AND METHOD FOR PERFORMING AN ACTION ON A STRUCTURE IN COMPUTER-GENERATED DATA

BACKGROUND OF THE INVENTION

1. Field of the Invention

This invention relates generally to manipulation of structures in computer data. More particularly, the invention relates to a system and method for performing computer-based actions on structures identified in computer data.

2. Description of the Background Art

Much data that appears in a computer user's day-to-day activities contains recognizable structures that have semantic significance such as phone numbers, e-mail addresses, post-office addresses, zip codes and dates. In a typical day, for example, a user may receive extensive files from word-processing programs and e-mail that contain several of these structures. However, visually searching data files or documents to find these structures is laborious and cognitively disruptive, especially if the document is lengthy and hard to follow. Furthermore, missing a structure such as a date may lead to missing an important meeting or missing a deadline.

To help facilitate searching a document for these structures, programmers can create or employ pattern analysis units, such as parsers, to automatically identify the structures. For the purposes of the present description, the term "pattern" refers to data, such as a grammar, regular expression, string, etc., used by a pattern analysis unit to recognize information in a document, such as dates, addresses, phone numbers, names, etc. The term "structure" refers to an instantiation of a pattern in the document. That is, a "date" pattern will recognize the structure "Oct. 31, 1995." The application of a pattern to a document is termed "parsing."

Conventional systems that identify structures in computer data do not enable automatic performance of an action on an identified structure. For example, if a long e-mail message is sent to a user, the user may implement a pattern analysis unit to search for particular structures, such as telephone numbers. Upon identification of a structure, the user may want to perform an action on the structure, such as moving the number to an electronic telephone book. This usually involves cutting the structure from the e-mail message, locating and opening the electronic telephone book application program, pasting the structure into the appropriate field, and closing the application program. However, despite the fact that computer systems are getting faster and more efficient, this procedure is still tedious and cognitively disruptive.

One type of system that has addressed this problem involves detecting telephone numbers. Such systems enable a user to select a telephone number and request that the application automatically dial the number. However, these systems do not recognize the selected data as a telephone number, and they generally produce an error message if the user selects invalid characters as a phone number. Also, they do not enable the performance of other candidate actions, such as moving the number to an electronic telephone book. That is, if a user wishes to perform a different action on an identified telephone number, such as storing the number in an address book, the user cannot automatically perform the action but must select and transfer the number to the appropriate data base as described above.

Therefore, a system is needed that identifies structures, associates candidate actions to the structures, enables selection of an action and automatically performs the selected action on the structure.

SUMMARY OF THE INVENTION

The present invention overcomes the limitations and deficiencies of previous systems with a system that identifies structures in computer data, associates candidate actions with each detected structure, enables the selection of an action, and automatically performs the selected action on the identified structure. It will be appreciated that the system may operate on recognizable patterns for text, pictures, tables, graphs, voice, etc. So long as a pattern is recognizable, the system will operate on it. The present invention has significant advantages over previous systems, in that the present system may incorporate an open-ended number and type of recognizable patterns, an open-ended number and type of pattern analysis units, and further that the system may enable an open-ended number and type (i.e. scripts, macros, code fragments, etc.) of candidate actions to associate with, and thus perform, on each identified structure.

The present invention provides a computer system with a central processing unit (CPU), input/output (I/O) means, and a memory that includes a program to identify structures in a document and perform selected computer-based actions on the identified structures. The program includes program subroutines that include an analyzer server, an application program interface, a user interface and an action processor. The analyzer server receives data from a document having recognizable structures, and uses patterns to detect the structures. Upon detection of a structure, the analyzer server links actions to the detected structure. Each action is a computer subroutine that causes the CPU to perform a sequence of operations on the particular structure to which it is linked. An action may specify opening another application, loading the identified structure into an appropriate field, and closing the application. An action may further include internal actions, such as storing phone numbers in an electronic phone book, addresses in an electronic address book, appointments on an electronic calendar, and external actions such as returning phone calls, drafting letters, sending facsimile copies and e-mail, and the like.

Since the program may be executed during the run-time of another program, i.e. the application which presents the document, such as Microsoft Word, an application program interface provides mechanisms for interprogram communications. The application program interface retrieves and transmits relevant information from the other program to the user interface for identifying, presenting and enabling selection of detected structures. Upon selection of a detected structure, the user interface presents and enables selection of candidate actions. When a candidate action is selected, the action processor performs the selected action on the selected structure.

In addition to the computer system, the present invention also provides methods for performing actions on identified structures in a document. In this method, the document is analyzed using a pattern to identify corresponding structures. Identified structures are stored in memory and presented to the user for selection. Upon selection of an identified structure, a menu of candidate actions is presented, each of which may be selected and performed on the selected structure.

BRIEF DESCRIPTION OF THE DRAWINGS

FIG. 6 illustrates a window with the identified structures in the example document of FIG. 5 highlighted based on the analyzer server of FIG. 4.

DETAILED DESCRIPTION OF THE PREFERRED EMBODIMENT

Figure 1:
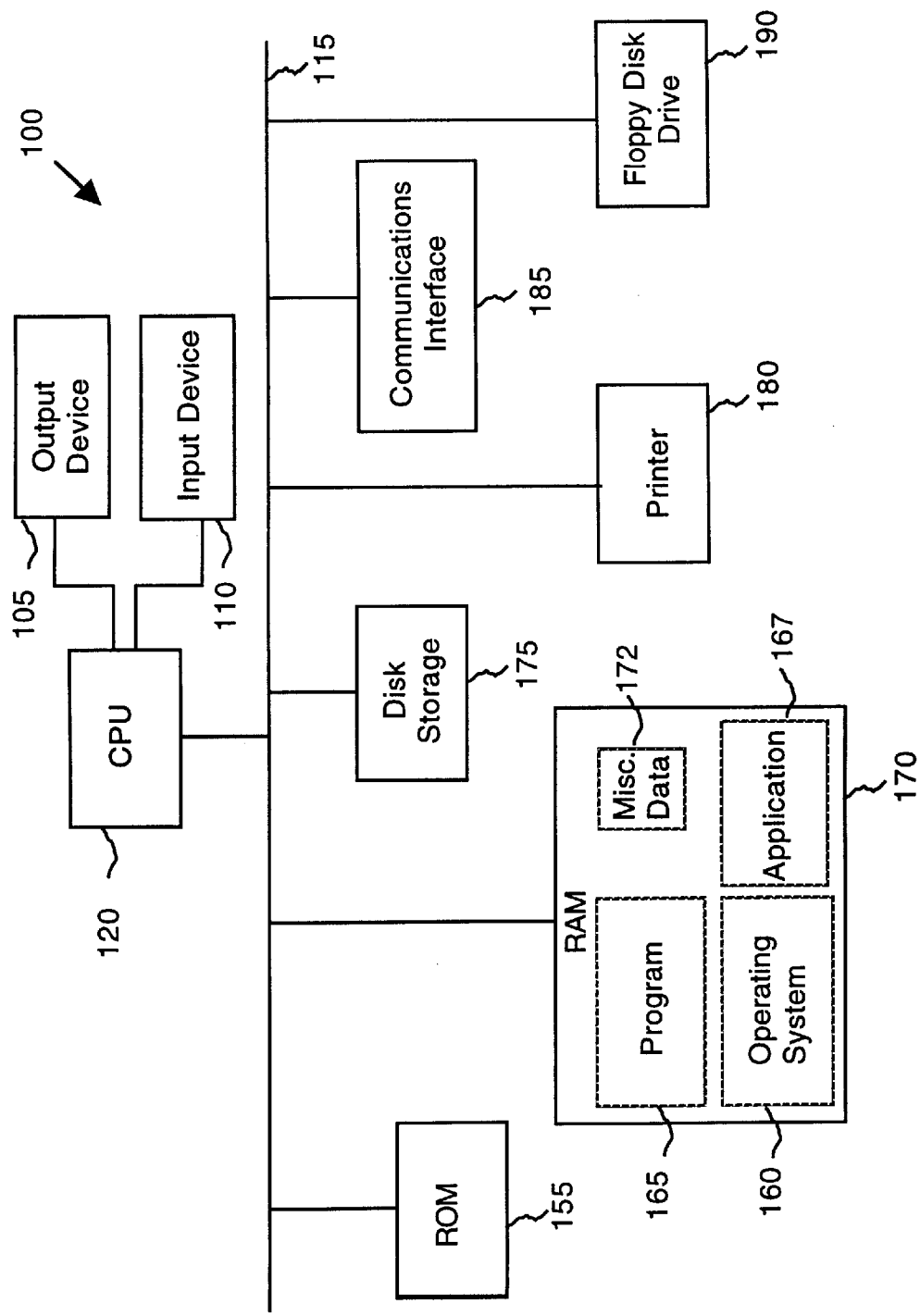
FIG. 1 is a block diagram of a computer system having a program stored in RAM, in accordance with the present invention.

Referring now to FIG. 1, a block diagram is shown of a computer system 100 including a CPU 120. Computer system 100 is preferably a microprocessor-based computer, such as a Power Macintosh manufactured by Apple Computer, Inc. of Cupertino, Calif. An input device 110, such as a keyboard and mouse, and an output device 105, such as a CRT or voice module, are coupled to CPU 120. ROM 155, RAM 170 and disk storage 175 are coupled to CPU 120 via signal bus 115. Computer system 100 optionally further comprises a printer 180, a communications interface 185, and a floppy disk drive 190, each coupled to CPU 120 via signal bus 115.

Operating system 160 is a program that controls and facilitates the processing carried out by CPU 120, and is typically stored in RAM 170. Application 167 is a program, such as a word-processor or e-mail program, that presents data on output device 105 to a user. The program 165 of the present invention is stored in RAM 170 and causes CPU 120 to identify structures in the data presented by application 167, to associate actions with the structures identified in the data, to enable the user to select a structure and an action, and to automatically perform the selected action on the identified structure. This program 165 may be stored in disk storage 175 and loaded into an allocated section of RAM 170 prior to execution by CPU 120. Another section of RAM 170 is used for storing intermediate results and miscellaneous data 172. Floppy disk drive 190 enables the storage of the present program 165 onto a removable storage medium which may be used to initially load program 165 into computer system 100.

Figure 2:
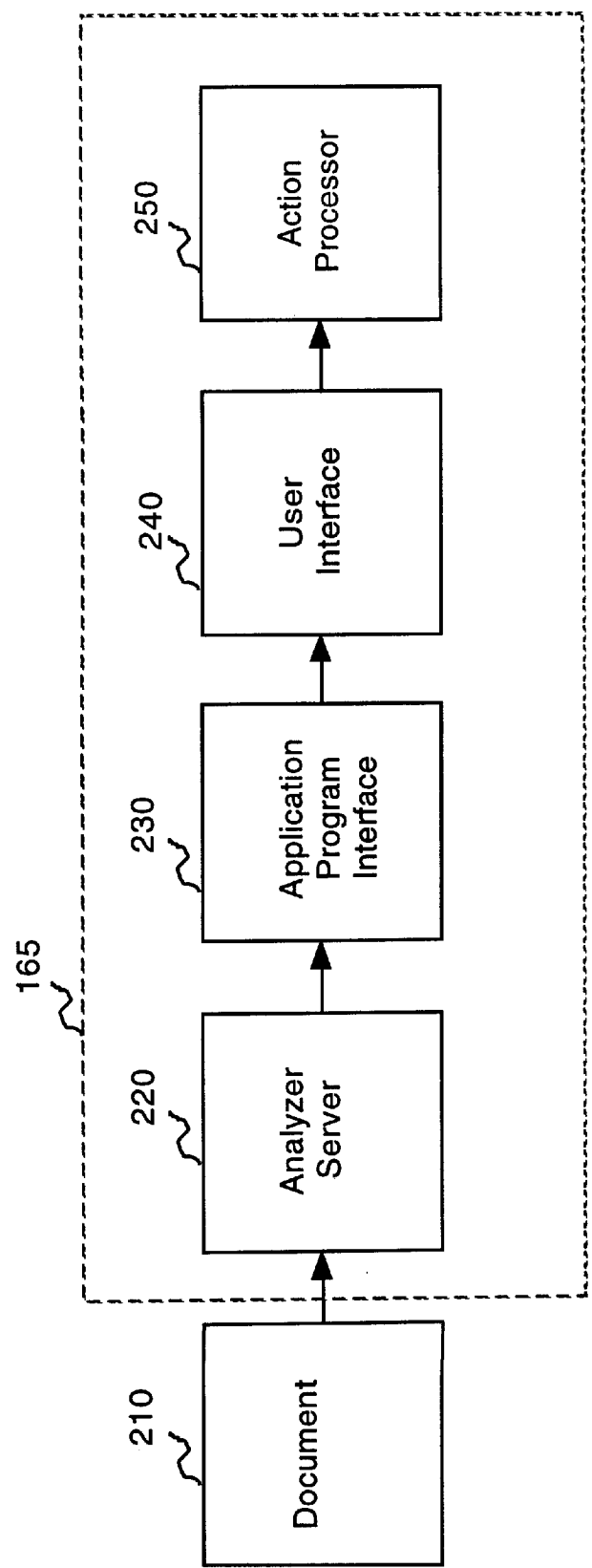
FIG. 2 is a block diagram of the program of FIG. 1.

Referring now to FIG. 2, a schematic block diagram of program 165 is shown together with its interaction with a document 210. Program 165 contains program subroutines including an analyzer server 220, an application program interface 230, a user interface 240 and an action processor 250. Analyzer server 220 receives data having recognizable patterns from a document 210, which may be retrieved from a storage medium such as RAM 170, ROM 155, disk storage 175, or the like, and presented on output device 105 by application 167. Analyzer server 220 comprises one or more pattern analysis units, such as a parser and grammars or a fast string search function and dictionaries, which uses patterns to parse document 210 for recognizable structures. Upon detection of a structure, analyzer server 220 links actions associated with the responsible pattern to the detected structure, using conventional pointers.

After identifying structures and linking actions, application program interface 230 communicates with application 167 to obtain information on the identified structures so that user interface 240 can successfully present and enable selection of the actions. In a display-type environment, application program interface 230 retrieves the locations in document 210 of the presentation regions for the detected structures from application 167. Application program interface 230 then transmits this location information to user interface 240, which highlights the detected structures, although other presentation mechanisms can be used. User interface 240 enables selection of an identified structure by making the presentation regions mouse-sensitive, i.e. aware when a mouse event such as a mouse-down operation is performed while the cursor is over the region. Alternative selection mechanisms can be used such as touch sensitive screens and dialog boxes. It will be appreciated that detected structures can be hierarchical, i.e. that a sub-structure can itself be selected and have actions associated with it. For example, a user may be able to select the year portion of an identified date, and select actions specific to the year rather than to the entire date.

User interface 240 communicates with application 167 through application program interface 230 to determine if a user has performed a mouse-down operation in a particular mouse-sensitive presentation region, thereby selecting the structure presented at those coordinates. Upon selection of this structure, user interface 240 presents and enables selection of the linked candidate actions using any selection mechanism, such as a conventional pull-down or pop-up menu.

The above description of the user interface is cast in terms of a purely visual environment. However, the invention is not limited to visual interface means. For example, in an audio environment, user interface 240 may present the structures and associated actions to the user using voice synthesis and may enable selection of a pattern and action using voice or sound activation. In this type of embodiment, analyzer server 220 may be used in conjunction with a text-to-speech synthesis application 167 that reads documents to users over a telephone. Analyzer server 220 scans document 210 to recognize patterns and link actions to the recognized patterns in the same manner as described above. In the audio environment, user interface 240 may provide a special sound after application 167 reads a recognized pattern, and enable selection of the pattern through the use of an audio interface action, such as a voice command or the pressing of a button on the touch-tone telephone keypad as before. Thus, user interface 240 may present the linked actions via voice synthesis. One can create various environments having a combination of sensory mechanisms.

Upon selection of a candidate action, user interface 240 transmits the selected structure and the selected action to action processor 250. Action processor 250 retrieves the sequence of operations that constitute the selected action, and performs the sequence using the selected structure as the object of the selected action.

Figure 3:
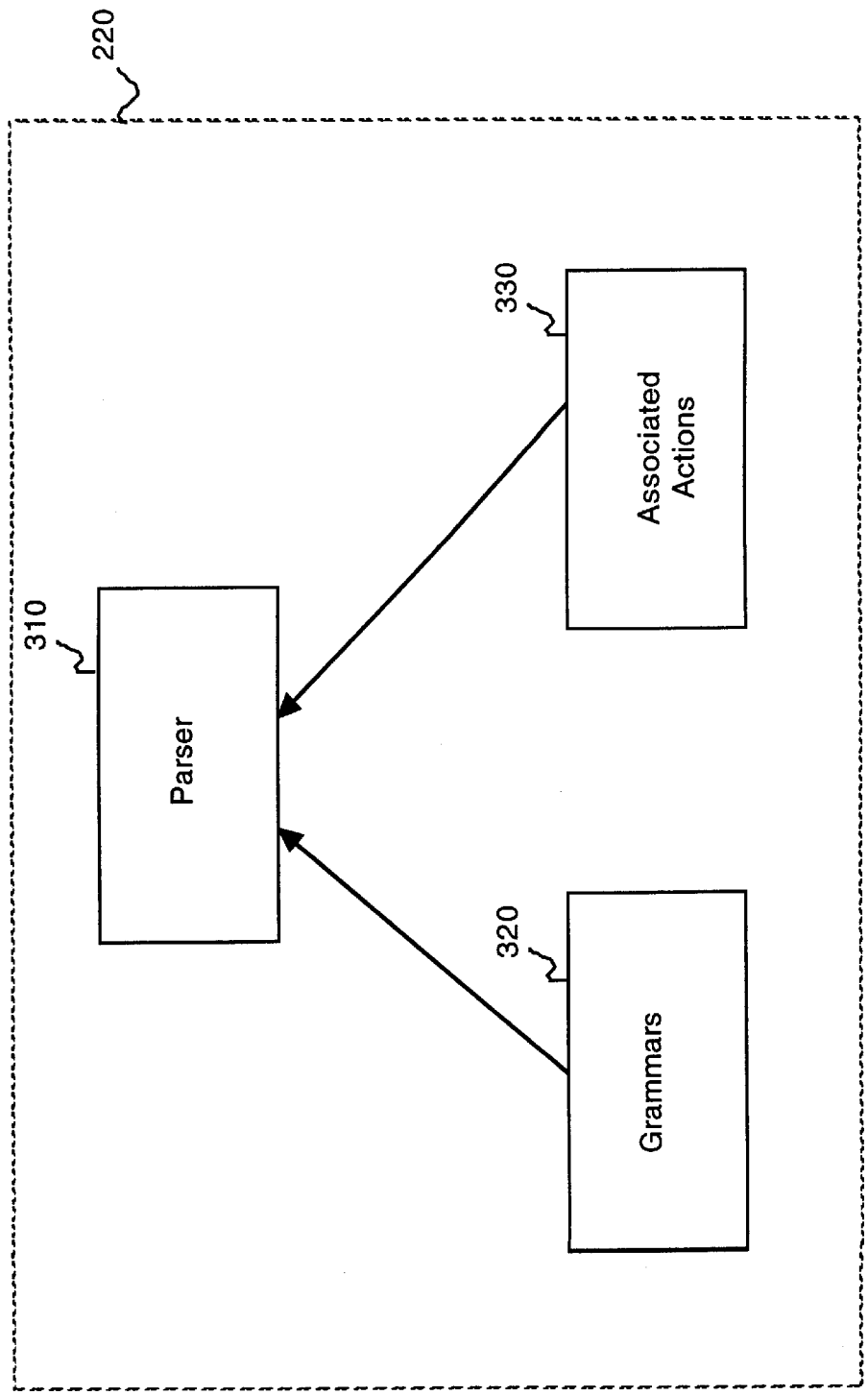
FIG. 3 is a block diagram illustrating the analyzer server of FIG. 2.

Referring now to FIG. 3, a block diagram illustrating an analyzer server 220 is shown. In this figure, analyzer server 220 is described as having a parser 310 and a grammar file 320, although alternatively or additionally a fast string search function or other function can be used. Parser 310 retrieves a grammar from grammar file 320 and parses text using the retrieved grammar. Upon identification of a structure in the text, parser 310 links the actions associated with the grammar to the identified structure. More particularly, parser 310 retrieves from grammar file 320 pointers attached to the grammar and attaches the same pointers to the identified structure. These pointers direct the system to the associated actions contained in associated actions file 330. Thus, upon selection of the identified structure, user interface 240 can locate the linked actions.

Figure 4:
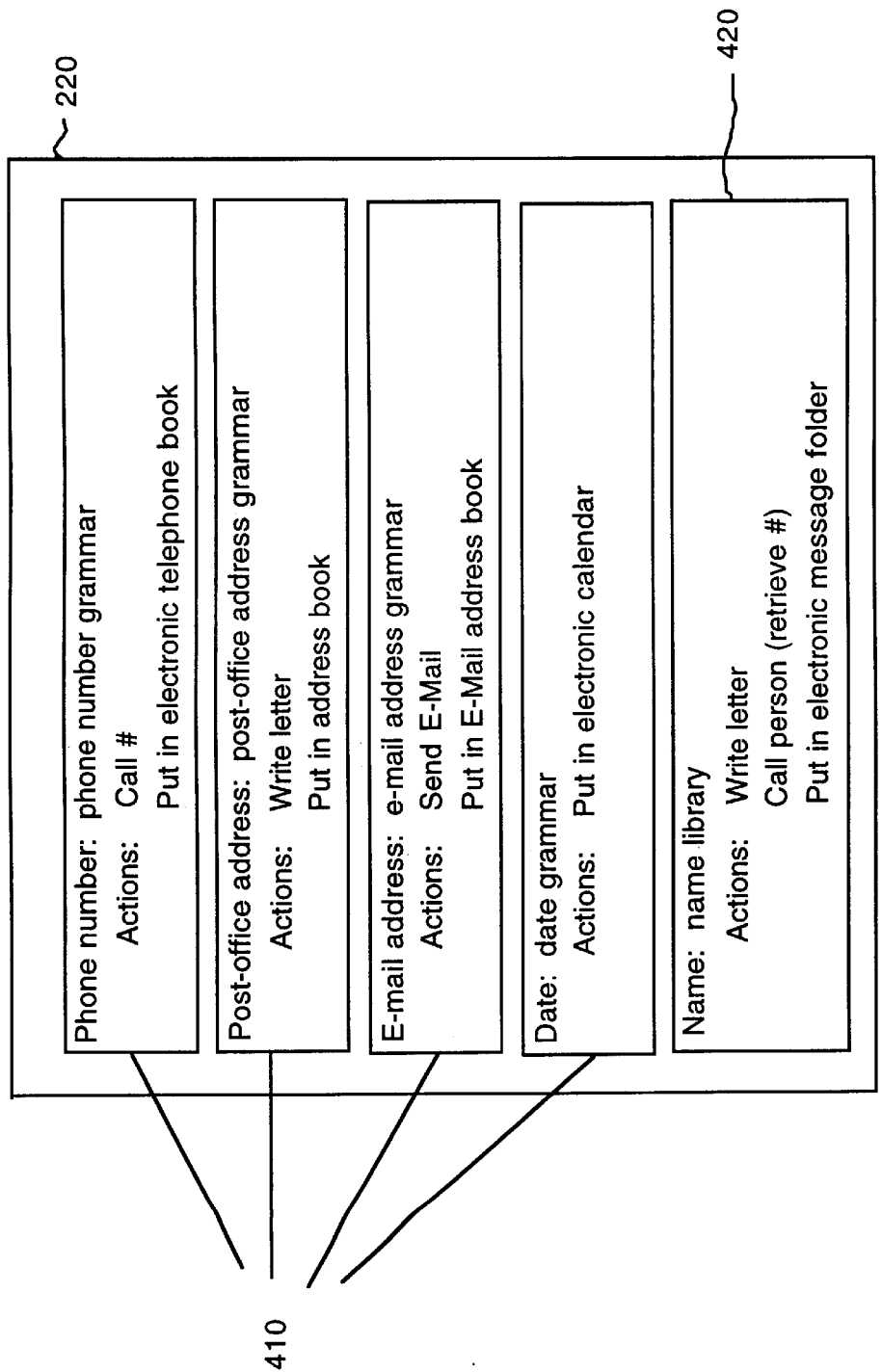
FIG. 4 is a block diagram illustrating a particular example of the analyzer server of FIG. 2.

FIG. 4 illustrates an example of an analyzer server 220, which includes grammars 410 and a string library 420 such as a dictionary, each with associated actions. One of the grammars 410 is a telephone number grammar with associated actions for dialing a number identified by the telephone number grammar or placing the number in an electronic telephone book. Analyzer server 220 also includes grammars for post-office addresses, e-mail addresses and dates, and a string library 420 containing important names. When analyzer server 220 identifies an address using the "e-mail address" grammar, actions for sending e-mail to the identified address and putting the identified address in an e-mail address book are linked to the address.

Figure 5:
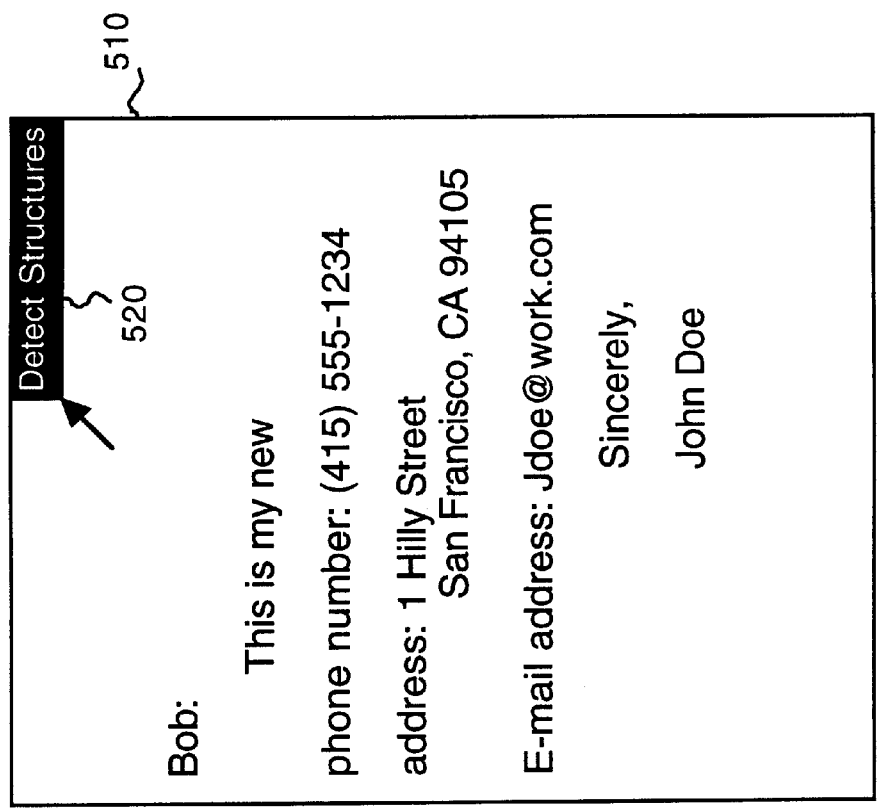
FIG. 5 illustrates a window presenting an example of a document having recognizable structures.

FIG. 5 shows a window 510 presenting an exemplary document 210 having data containing recognizable structures, including a phone number, post-office address, e-mail address, and name. Window 510 includes a button 520 for initiating program 165, although alternative mechanisms such as depressing the "option" key may be used. Upon initiation of program 165, system 100 transmits the contents of document 210 to analyzer server 220, which parses the contents based on grammars 410 and strings 420 (FIG. 4). This parsing process produces the window shown in FIG. 6. As illustrated in FIG. 6, analyzer server 220 identifies the phone number, post-office address, e-mail address and name. Although not shown in FIG. 6, analyzer server 220 links the actions associated with grammars 410 and strings 420 to these identified structures, and application program interface 230 retrieves information on the location of these structures from application 167. User interface 240 then highlights the identified structures in document 210, and makes the identified structures mouse-sensitive.

Figure 7:
FIG. 7 illustrates a window showing the display of a pop-up menu for selecting an action.

As shown in FIG. 7, upon recognition of a mouse-down operation over a structure, user interface 240 presents a pop-up menu 710. In this example, pop-up menu 710 displays the candidate actions linked to the selected telephone number grammar 410, including dialing the number and putting the number into an electronic telephone book. Upon selection of the action for putting the number in an electronic telephone book, user interface 240 transmits the corresponding telephone number and selected action to action processor 250. Action processor 250 locates and opens the electronic telephone book, places the telephone number in the appropriate field and allows the user to input any additional information into the file.

Figure 8:
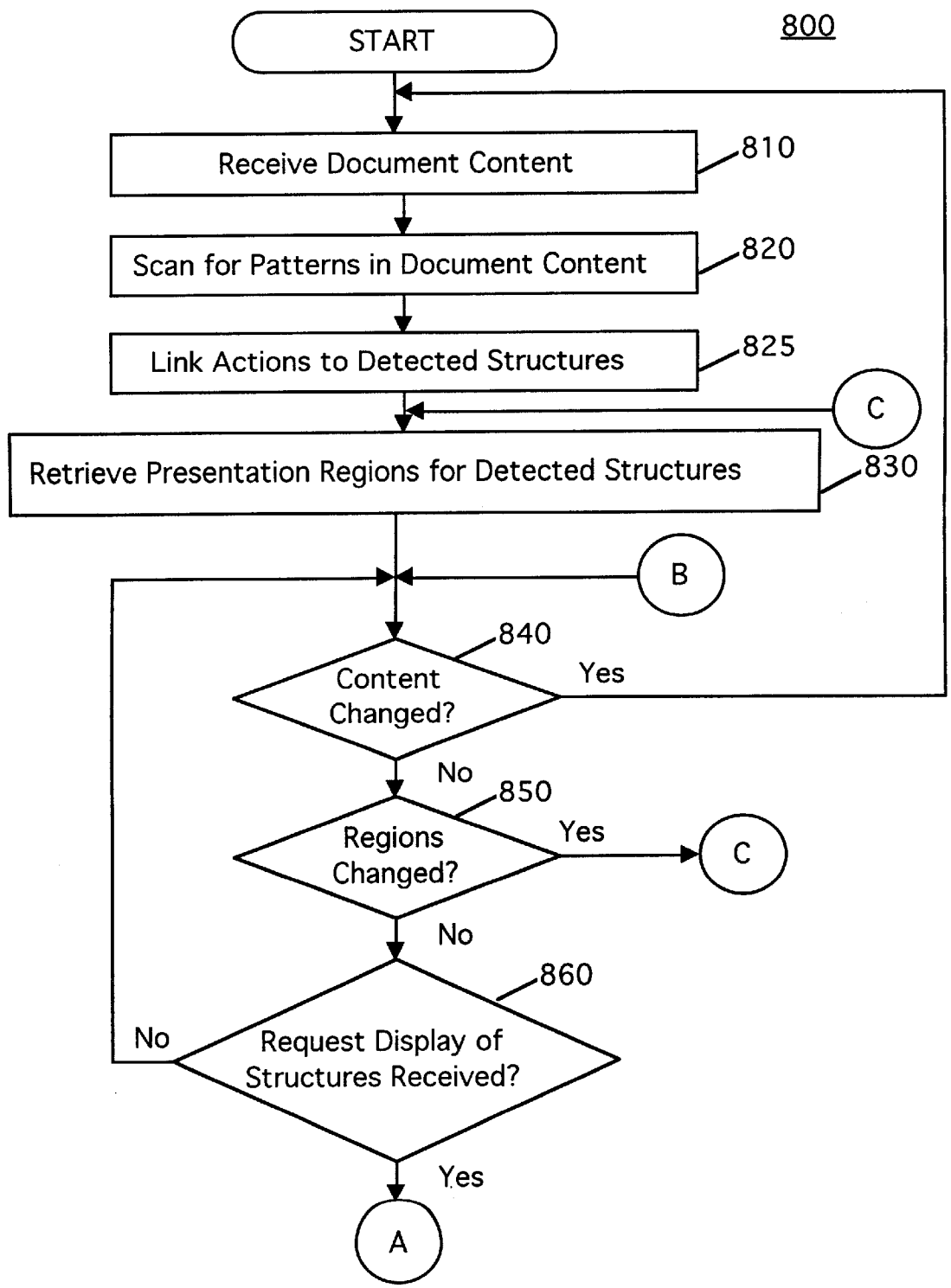
FIGS. 8 and 9 together are a flowchart depicting the preferred method for selecting and performing an action on an identified structure.
Figure 9:
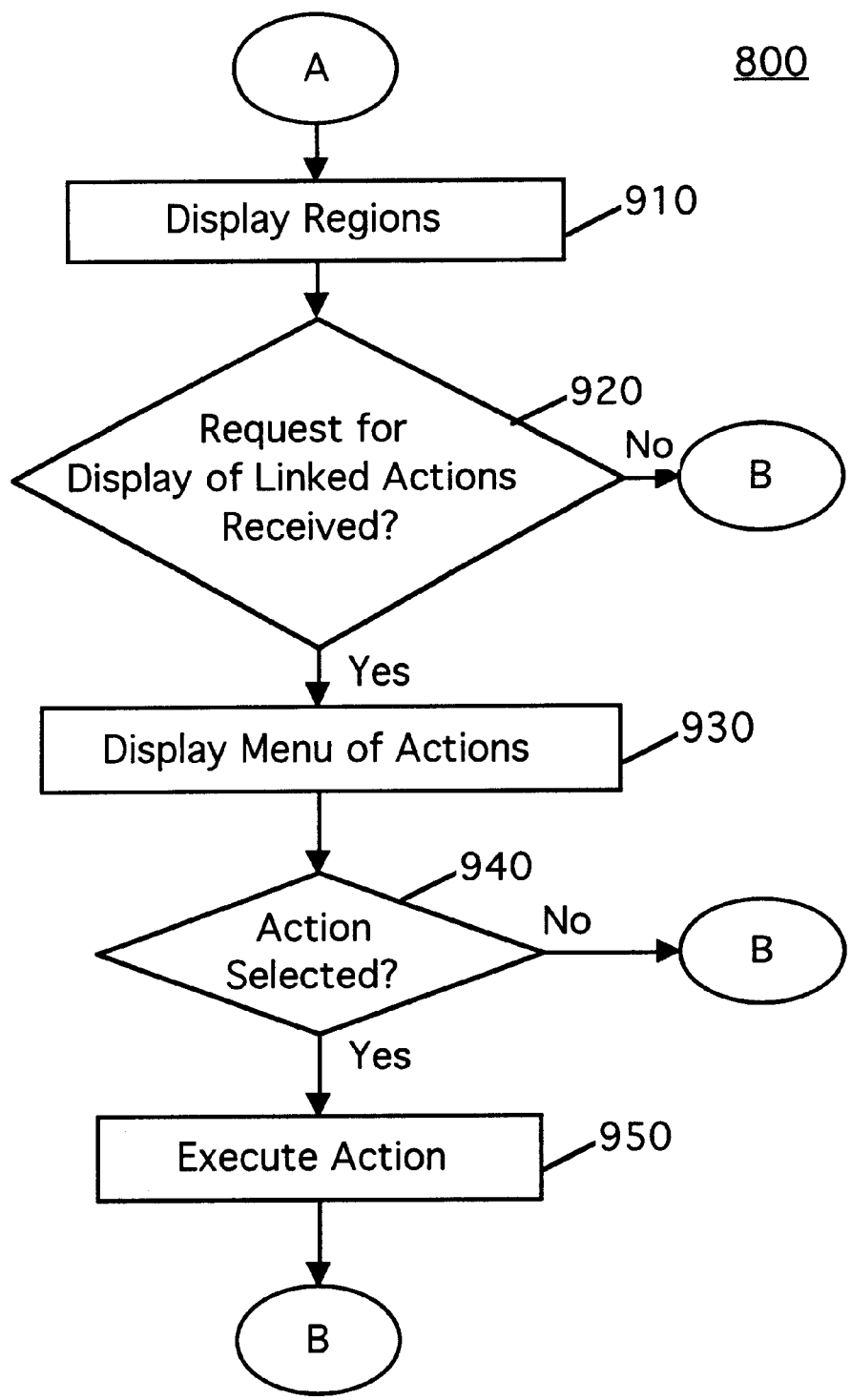

FIGS. 8 and 9 display a flowchart illustrating preferred method 800 for recognizing patterns in documents and performing actions. This method is carried out during the run-time of application 167. Referring first to FIG. 8, method 800 starts by receiving 810 the content, or a portion of the content, from document 210. Assuming program 165 initiates with the receipt of any text, the received content or portion is scanned 820 for identifiable structures using the patterns in analyzer server 220. Upon detection of a structure based on a particular pattern, actions associated with the particular pattern are linked 825 to the detected structure. Assuming a display-type environment, the presentation region location for a detected structure is retrieved 830 from application 167. If the document content being displayed on output device 105 is changed 840, for example by the user adding or modifying text, method 800 restarts. Otherwise, method 800 continues with block 850. If the presentation regions change 850, for example by the a user scrolling document 210, then new presentation regions from application 167 are again retrieved 830. Otherwise, method 800 continues to block 860. As illustrated by block 860, method 800 loops between blocks 840 and 860 until a request for display of identified structures is received 860. It will be appreciated that the steps of the loop (blocks 840, 850 and 860) can be performed by application 167.

Referring also to FIG. 9, when a request for the display of detected structures is received 860, the regions are displayed 910 using presentation mechanisms such as highlighting the presentation region around each detected structure, although alternative presentation mechanisms can be used. If a request for the display of candidate actions linked to a detected structure is not received 920, method 800 returns to block 840. However, if a request is received 920, the actions linked in block 825 are displayed 930. This request for display of candidate actions can be performed using a selection mechanism, such as a mouse-down operation over a detected structure, which causes the candidate actions linked to the structure to be displayed 930. Display 930 of candidate actions may be implemented using a pop-up menu, although alternative presentation mechanisms can be used such as pull-down menus, dialog boxes and voice synthesizers.

As illustrated in block 940, if an action from the displayed candidate actions is not selected 940, method 800 returns to block 840. However, if an action is selected 940, the action is executed 950 on the structure selected in block 920. After execution 950 of an action, method 800 returns to block 840. Method 800 ends when the user exits application 167, although other steps for ending method 800 can alternatively be used.

Figure 10:
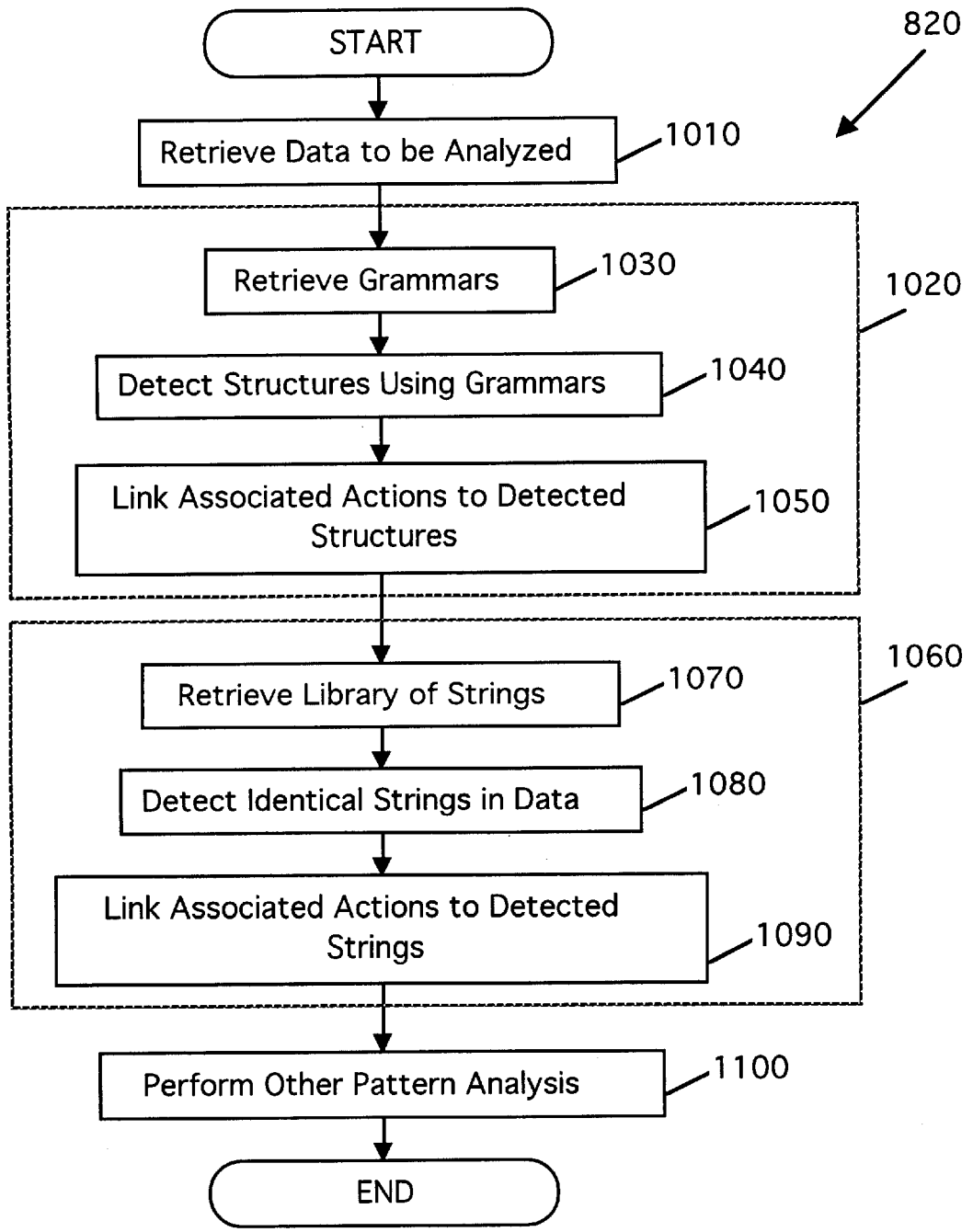
FIG. 10 is a flowchart depicting the preferred method for identifying a structure in a data sample.

Referring now to FIG. 10, a flowchart illustrating the preferred method 820 for scanning and detecting patterns in a document is shown. Method 820 starts by retrieving 1010 data to be analyzed. After the data is retrieved, several pattern analysis processes may be performed on the data. As illustrated in block 1020, a parsing process retrieves 1030 grammars, detects 1040 structures in the data based on the retrieved grammars, and links 1050 actions associated with each grammar to each structure detected by that grammar. As illustrated in block 1060, a fast string search function retrieves 1070 the contents of string library 420, detects 1080 the strings in the data identical to those in the string library 420, and links 1090 actions associated with the library string to the detected string. As illustrated in block 1100, additional pattern analysis processes, such as a neural net scan, can be performed 1100 to detect in the data other patterns, such as pictures, graphs, sound, etc. Method 820 then ends. Alternatively, the pattern analysis processes can be performed in parallel using a multiprocessor multitasking system, or using a uniprocessor multithreaded multitasking system where a thread is allocated to execute each pattern detection scheme.

These and other variations of the preferred and alternate embodiments and methods are provided by the present invention. For example, program 165 in FIG. 1 can be stored in ROM, disk, or in dedicated hardware. In fact, it may be realized as a separate electronic circuit. Other components of this invention may be implemented using a programmed general purpose digital computer, using application specific integrated circuits, or using a network of interconnected conventional components and circuits. The analyzer server 220 of FIG. 2 may use a neural net for searching a graphical document 210 for faces, or a musical library for searching a stored musical piece 210 for sounds. The user interface 240 may present structures and actions via voice synthesis over a telephone line connection to system 100. The embodiments described have been presented for purposes of illustration and are not intended to be exhaustive or limiting, and many variations and modifications are possible in light of the foregoing teaching. The system is limited only by the following claims.

What is claimed is:

1. A computer-based system for detecting structures in data and performing actions on detected structures, comprising:

an input device for receiving data;

an output device for presenting the data;

a memory storing information including program routines including an analyzer server for detecting structures in the data, and for linking actions to the detected structures;

a user interface enabling the selection of a detected structure and a linked action; and an action processor for performing the selected action linked to the selected structure; and a processing unit coupled to the input device, the output device, and the memory for controlling the execution of the program routines.

2. The system recited in claim 1, wherein the analyzer server stores detected structures in the memory.

3. The system recited in claim 1, wherein the input device receives the data from an application running concurrently, and wherein the program routines stored in memory further comprise an application program interface for communicating with the application.

4. The system recited in claim 1, wherein the analyzer server includes grammars and a parser for detecting structures in the data.

5. The system recited in claim 4, wherein the analyzer server includes actions associated with each of the grammars, and wherein the analyzer server links to a detected structure the actions associated with the grammar which detects that structure.

6. The system recited in claim 1, wherein the analyzer server includes a string library and a fast string search function for detecting string structures in the data.

7. The system recited in claim 6, wherein the analyzer server includes actions associated with each of the strings, and wherein the analyzer server links to a detected structure the actions associated with the grammar which detects that string structure.

8. The system recited in claim 1, wherein the user interface highlights detected structures.

9. The system recited in claim 1, wherein the user interface enables selection of an action by causing the output device to display a pop-up menu of the linked actions.

10. The system recited in claim 1, wherein the programs stored in the memory further comprise an application running concurrently that causes the output device to present the data received by the input device, and an application program interface that provides interrupts and communicates with the application.

11. The system recited in claim 1, wherein the user interface enables the selection of a detected structure and a linked action using sound activation.

12. The system recited in claim 1, wherein a first one of the actions may invoke a second one of the actions.

13. A program storage medium storing a computer program for causing a computer to perform the steps of:

receiving computer data;

detecting a structure in the data;

linking at least one action to the detected structure;

enabling selection of the structure and a linked action; and executing the selected action linked to the selected structure.

14. In a computer having a memory storing actions, a system for causing the computer to perform an action on a structure identified in computer data, comprising:

means for receiving computer data;

means for detecting a structure in the data;

means for linking at least one action to the detected structure;

means for selecting the structure and a linked action; and means for executing the selected action linked to the selected structure.

15. In a computer having a memory storing actions, a method for causing the computer to perform an action on a structure identified in computer data, comprising the steps of:

receiving computer data;

detecting a structure in the data;

linking at least one action to the detected structure;

enabling selection of the structure and a linked action; and executing the selected action linked to the selected structure.

16. The method recited in claim 15, wherein the computer data is received from the application running concurrently.

17. The method recited in claim 15, wherein the memory contains grammars, and wherein the step of detecting a structure further comprises the steps of retrieving a grammar and parsing the data based on the grammar.

18. The method recited in claim 17, wherein the grammar is associated with a particular action, and wherein the step of linking at least one action to the detected structure includes the step of linking the particular action to the detected structure.

19. The method recited in claim 15, wherein the memory contains strings, and wherein the step of detecting a structure further comprises the steps of retrieving a string from the memory and scanning the data to identify the string.

20. The method recited in claim 15, further comprising after the step of detecting a structure, the step of highlighting the detected structure.

21. The method recited in claim 15, further comprising, after the step of linking at least one action to the detected structure, the step of displaying and enabling selection of an action for performance on the detected structure.

22. A computer-based method for causing a computer to identify, select and perform an action on a structure in computer data received from a concurrently running application, said application presenting the computer data to the user, the method comprising the steps of:

receiving computer data from the application;

detecting a structure in the computer data;

linking at least one action to the detected structure;

communicating with the application to determine the location of the detected structure as presented by the application, to enable selection of the detected structure and a linked action, and to determine if the detected structure and a linked action have been selected; and performing a selected action linked to the detected pattern.

23. The method recited in claim 15, wherein the step of enabling uses sound activation.

24. The method recited in claim 15, wherein a first one of the actions may invoke a second one of the actions.

\* \* \* \* \*

(12) EX PARTE REEXAMINATION CERTIFICATE (10631st)
United States Patent
Miller et al.

(10) Number: US 5,946,647 C1
(45) Certificate Issued: Jun. 17, 2015

(54) SYSTEM AND METHOD FOR PERFORMING AN ACTION ON A STRUCTURE IN COMPUTER-GENERATED DATA

(75) Inventors: James R. Miller, Mountain View, CA (US); Thomas Bonura, Capitola, CA (US); Bonnie Nardi, Mountain View, CA (US); David Wright, Santa Clara, CA (US)

(73) Assignee: APPLE INC., Cupertino, CA (US)

Reexamination Request:
No. 90/011,287, Oct. 15, 2010

Reexamination Certificate for:
Patent No.: 5,946,647
Issued: Aug. 31, 1999
Appl. No.: 08/595,257
Filed: Feb. 1, 1996

(51) Int. Cl.
*G06F 17/27* (2006.01)
*H04M 1/2745* (2006.01)
*H04M 1/274* (2006.01)

(52) U.S. Cl.
CPC ....... *G06F 17/2715* (2013.01); *H04M 1/27455* (2013.01)

(58) Field of Classification Search
None
See application file for complete search history.

(56) References Cited

To view the complete listing of prior art documents cited during the proceeding for Reexamination Control Number 90/011,287, please refer to the USPTO's public Patent Application Information Retrieval (PAIR) system under the Display References tab.

*Primary Examiner* — Mary Steelman

(57) ABSTRACT

A system and method causes a computer to detect and perform actions on structures identified in computer data. The system provides an analyzer server, an application program interface, a user interface and an action processor. The analyzer server receives from an application running concurrently data having recognizable structures, uses a pattern analysis unit, such as a parser or fast string search function, to detect structures in the data, and links relevant actions to the detected structures. The application program interface communicates with the application running concurrently, and transmits relevant information to the user interface. Thus, the user interface can present and enable selection of the detected structures, and upon selection of a detected structure, present the linked candidate actions. Upon selection of an action, the action processor performs the action on the detected structure.

Attention is directed to the decision of *Motorola Mobility Inc.* v. *Apple Inc et al.* 1:12 cv 79 relating to this patent. This reexamination may not have resolved all questions raised by this decision. See 37 CFR 1.552(c) for *ex parte* reexamination and 37 CFR 1.906(c) for *inter partes* reexamination.

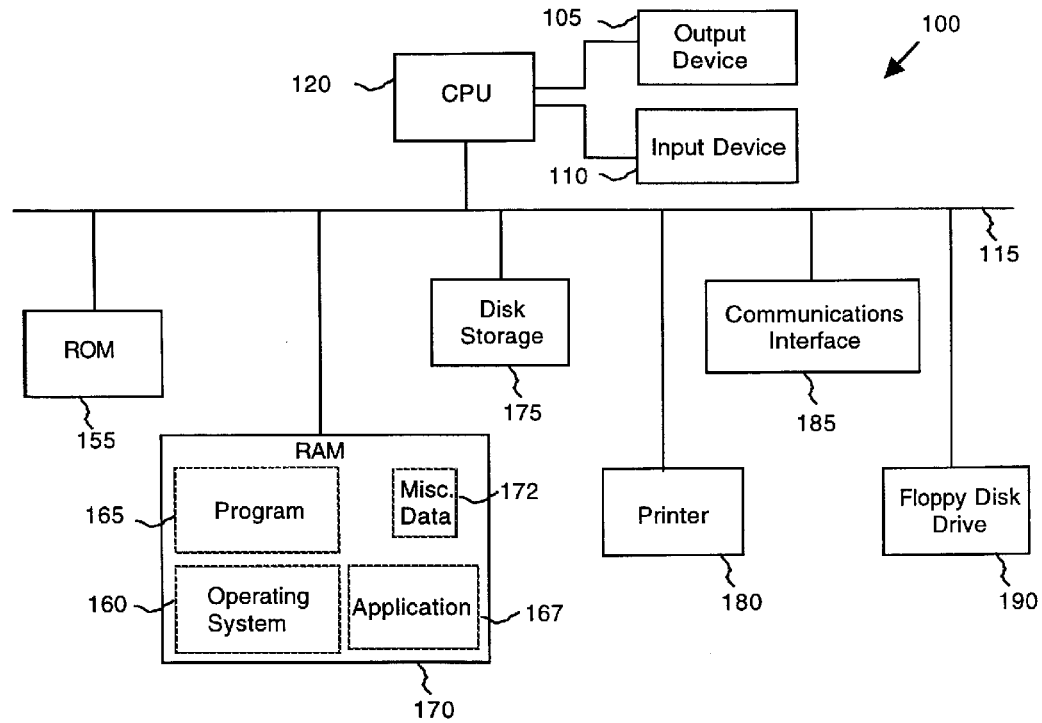

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-12, 14, 17 and 18 is confirmed.

Claims 13, 15, 16 and 19-24 are cancelled.

New claims 25-27 are added and determined to be patentable.

25. *A computer-based system for detecting structures in data and performing actions on detected structures, comprising:*
   *an input device for receiving data;*
   *an output device for presenting the data;*
   *a memory storing information including program routines including*
   *an analyzer server for detecting structures in the data, wherein detecting includes finding and recognizing the structure, and for linking actions to the detected structures;*
   *a user interface enabling the selection of a detected structure and a linked action; and*
   *an action processor for performing the selected action linked to the selected structure; and*
   *a processing unit coupled to the input device, the output device, and the memory for controlling the execution of the program routines.*

26. *A computer-based system for detecting structures in data and performing actions on detected structures, comprising:*
   *an input device for receiving data;*
   *an output device for presenting the data;*
   *a memory storing information including program routines including*
   *an analyzer server for detecting structures in the data, and for linking actions to the detected structures;*
   *a user interface enabling the selection of a detected structure:*
   *the user interface enabling the selection of a linked action; and*
   *an action processor for performing a selected action linked to a selected structure; and*
   *a processing unit coupled to the input device, the output device, and the memory for controlling the execution of the program routines.*

27. *The computer-based system of claim 26, wherein the user interface enables the selection of a linked action in response to receiving a selection of a detected structure.*

* * * * *